Patented Feb. 22, 1944

2,342,493

UNITED STATES PATENT OFFICE 2,342,493

ORGANIC NITROGEN COMPOUNDS AND PROCESS OF PRODUCING SAME

Walter Reppe and Otto Hecht, Ludwigshafen-on-the-Rhine, and Ernst Gassenmeier, Mannheim, Germany, assignors, by mesne assignments, to General Aniline & Film Corporation, New York, N. Y., a corporation of Delaware No Drawing. Application July 10, 1940, Serial No. 344,780. In Germany July 29, 1939

10 Claims. (Cl. 260—577)

The present invention relates to organic nitrogen compounds containing acetylenic linkages and a process of preparing same, in particular it relates to the production of aromatic amines being substituted in the amino group by an aliphatic radicle containing a triple carbon linkage.

It has already been proposed to prepare resinous condensation products by treating aromatic amines with acetylene in the presence of mercury salts. We have now found that the interaction of acetylene with aromatic primary or secondary amines, or, in other words, aromatic amines containing at least one hydrogen atom attached to the amino group, may be so directed that monomeric amino compounds are formed which differ fundamentally from the known resinous condensation products. According to our invention acetylene is caused to act on primary or secondary aromatic amines in the presence of acetylides of the heavy metals of the first and second group of the periodic system, in particular the acetylides of copper, silver, gold or mercury, and in the presence of an inert diluent. At least part of the aromatic amine to be condensed should be in the form of the salt of an organic acid during the reaction.

Suitable organic acids are in particular such acids as are capable of forming salts with aromatic amines soluble in the usual diluents, e. g. low-molecular aliphatic mono- and di-carboxylic acids such as acetic acid, propionic acid, succinic acid or adipic acid. Since metal acetylides are liable to be decomposed by the action of acids, the amount of acid should not be substantially in excess of that necessary for the salt-formation with the aromatic amine. Generally speaking, the hydrogen ion concentration should not be in excess of a pH-value of 2.5.

The invention is broadly applicable to the conversion of primary or secondary aromatic amines. Particularly suitable amines are primary mononuclear amines of the benzene series and their N-alkylated or -aralkylated derivatives, such as N-methyl-, N-ethyl- or n-benzylaniline, -toluidine, -xylidine, -anisidine, -cresidine, -chloraniline and the like. Polynuclear amines may also be used as starting materials, however, they react more slowly than mononuclear amines.

The heavy metal acetylides serving as catalysts may be used in the form of an aqueous paste or applied to carriers, e. g. kieselguhr or fuller's earth. They may be prepared by the action of acetylene on metal salts in the presence of a substance capable of binding acids, such as calcium carbonate or magnesium oxide, or on metal oxides and hydroxides. Suitable inert diluents are for example liquid hydrocarbons, in particular aromatic or hydroaromatic hydrocarbons such as benzene, toluene or dekahydronaphthalene, or alcohols, esters or ethers, such as methanol, ethyl alcohol or tetrahydrofurane, or even water itself.

The reaction proceeds at ordinary temperature, but higher temperatures, as for example from 50 to 120° C., or more may be used. Since the reaction products are liable to be decomposed or polymerized at higher temperatures, it is preferable to work at temperatures up to about 60° C. In order to prevent by-reactions of the final products, it is suitable to add small amounts of stabilizers to the reaction mixture, in particular compounds which have proved useful for the stabilization of monomeric vinyl compounds. There may be mentioned phenols, such as hydroquinone or β.β'dinaphthol. If mononuclear amines of the benzene series are used as starting materials, there may also be added amines as stabilizers which react more difficultly than these starting materials, for example phenyl-β-naphthylamine or meta-phenylamino-diphenylamine. Suitable stabilizers are also thioethers such as di-para-tert.-butylphenylsulfide or thioamines, e. g. thiosinamine.

Working may be effected at atmospheric or increased pressure, e. g. at pressures from 5 to 30 atmospheres or more, and continuously or discontinuously. Inert diluent gases, such as nitrogen or hydrogen may also be used. As starting gas there may also be mentioned the dilute acetylene obtained by the thermal decomposition of hydrocarbons, as for example in the electric arc, which contains up to 20 per cent of acetylene.

The compounds formed according to my invention constitute arylaminobutines corresponding to the formula

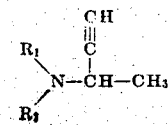

wherein at least one of the radicles $R_1$ and $R_2$ represents an aromatic radicle, the other representing hydrogen or an alkyl (including cycloalkyl), aralkyl or aryl radicle. They may be used as dyestuff intermediates, for example, as coupling components in preparing azo dyestuffs.

The following examples will further illustrate how this invention may be carried out in practice but the invention is not restricted to these examples. The parts are by weight.

*Example 1*

A pressure-tight vessel provided with a stirrer is charged with a solution of 465 parts of aniline in 1200 parts of alcohol, 180 parts of glacial acetic acid, 10 parts of β.β'-dinaphthol and 42 parts of copper acetylide in the form of an aqueous paste. A mixture of acetylene and nitrogen in the ratio of 2:3 is pressed in under 25 atmospheres pressure at ordinary temperature. Acetylene is absorbed and fresh acetylene is continuously pressed in from time to time to maintain the initial pressure. When the absorption of acetylene slows down, the vessel is heated to 60° C. and allowed to cool. Then acetylene is again pressed in. This is repeated until acetylene is no longer absorbed though having heated the reaction mixture to 60° C.

400 parts of acetylene are thus absorbed. The reaction mixture is filtered off, the filtrate freed from low-boiling constituents by distillation in vacuo and the oily residue dissolved in water. The aqueous solution is made alkaline by the addition of aqueous 30 per cent soda lye and extracted with ether. After having dried and filtered the ethereal solution, the ether is distilled off and the residue distilled in vacuo, whereby 200 parts of aniline and about 180 parts of a fraction boiling at from 110 to 112° C. under 15 millimeters pressure (mercury gauge) are obtained. This latter fraction solidifies to colorless crystals melting at 74° C. The compound corresponds to the formula

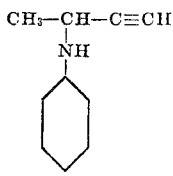

2-N-phenylaminobutine-3

The reaction mixture may also be washed up by means of steam-distillation. Unchanged aniline is thus obtained together with phenylaminobutine as the distillate. By distillation in fractions this mixture is separated into the two constituents.

Phenylaminobutine may also be obtained from 465 parts of aniline, 1500 parts of alcohol, 140 parts of formic acid, 10 parts of β.β'-dinaphthol and 42 parts of copper acetylide under the conditions described above. Succinic or adipic acid may also be used instead of formic or acetic acid.

*Example 2*

A mixture of 535 parts of N-methylaniline, 180 parts of glacial acetic acid, 10 parts of β.β'-dinaphthol, 1200 parts of alcohol and 42 parts of copper acetylide are treated in the manner described in Example 1 with acetylene and nitrogen. When acetylene is no longer absorbed, further 20 parts of copper acetylide are added, whereby the absorption of further amounts of acetylene is made possible. The total absorption of acetylene amounts to 370 parts. When working up the reaction mixture in the manner described in Example 2, 140 parts of 2-N-phenyl-N-methylaminobutine-3

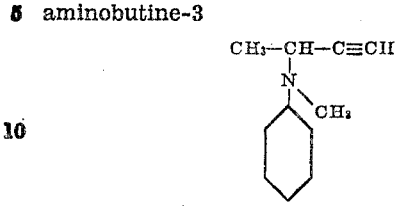

(boiling point 116° C. under 15 millimeters pressure) are obtained.

Instead of acetic acid, there may be used succinic or adipic acid.

*Example 3*

A mixture of N-ethylaniline, 180 parts of glacial acetic acid, 10 parts of phenyl-β-naphthylamine, 1200 parts of alcohol and 42 parts of copper acetylide are treated in the manner described in Example 1 with acetylene and nitrogen. When working up the reaction mixture in the manner described in Example 1, there is obtained as a fraction boiling at from 120 to 122° C. under 15 millimeters pressure 2-N-phenyl-N-ethylaminobutine-3 corresponding to the formula

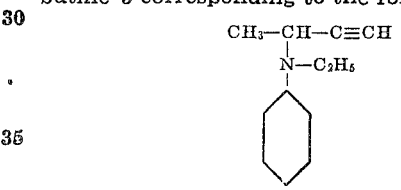

What we claim is:

1. A process of producing arylamino butines which comprises treating with acetylene in the liquid phase arylamines of the benzene series selected from the class consisting of primary arylamines and secondary N-alkyl, and -aralkyl arylamines in the presence of an inert diluent and a low molecular aliphatic carboxylic acid and in the presence of a catalyst comprising essentially an acetylide selected from the first and second group of the periodic system.

2. A process of producing arylamino butines which comprises treating with acetylene in the liquid phase arylamines of the benzene series selected from the class consisting of primary arylamines and secondary N-alkyl, and -aralkyl arylamines in the presence of an inert diluent and a low molecular aliphatic carboxylic acid and in the presence of copper acetylide.

3. A process of producing arylamino butines which comprises treating with acetylene in the liquid phase at temperatures from normal to about 60° C. arylamines of the benzene series selected from the class consisting of primary arylamines and secondary N-alkyl, and -aralkyl arylamines in the presence of an inert diluent and a low molecular aliphatic carboxylic acid and in the presence of copper acetylide.

4. A process of producing arylamino butines which comprises treating with acetylene in the liquid phase under superatmospheric pressure at temperatures from normal to about 60° C. mononuclear amino compounds of the benzene series selected from the class consisting of primary arylamines and secondary N-alkyl, and -aralkyl arylamines in the presence of an inert diluent and a low molecular aliphatic carboxylic acid and in the presence of copper acetylide.

5. A process of producing 2-phenylaminobutine-3 which comprises treating aniline with acetylene in the liquid phase in the presence of an inert diluent and a low molecular aliphatic carboxylic acid and in the presence of copper acetylide.

6. 2-phenylaminobutine-3.

7. Aminobutines containing the amino group attached to carbon atom No. 2 and the triple linkage between carbon atoms Nos. 3 and 4 and being substituted in the amino group by an aryl radicle of the benzene series which is directly attached to said amino group.

8. Aminobutines having the following structural formula:

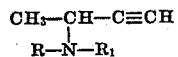

in which R stands for an aryl radicle of the benzene series which is directly attached to the N-atom, and $R_1$ stands for an alkyl radicle.

9. 2-N-phenyl-N-methylaminobutine-3.
10. 2-N-phenyl-N-ethylaminobutine-3.

WALTER REPPE.
OTTO HECHT.
ERNST GASSENMEIER.